United States Patent [19]

Oliker

[11] Patent Number: 4,652,278

[45] Date of Patent: Mar. 24, 1987

[54] SOLIDS DRYING

[75] Inventor: Michael D. Oliker, Amesbury, Mass.

[73] Assignee: Near Equilibrium Research Associates, Amesbury, Mass.

[21] Appl. No.: 794,321

[22] Filed: Nov. 1, 1985

Related U.S. Application Data

[60] Continuation of Ser. No. 484,159, Apr. 12, 1983, abandoned, which is a continuation-in-part of Ser. No. 361,134, Mar. 25, 1982, abandoned, which is a division of Ser. No. 361,134.

[51] Int. Cl.$^4$ .......... B01D 53/04

[52] U.S. Cl. .......... 55/20; 34/28; 34/31; 34/66; 34/80; 55/34; 55/62; 55/77; 55/163; 55/208

[58] Field of Search .......... 34/13, 13.4, 22, 25–33, 34/35, 40, 66, 80; 55/18, 20, 21, 33–35, 60, 62, 74, 75, 77, 79, 161–163, 179–181, 208, 387, 389

[56] References Cited

U.S. PATENT DOCUMENTS

| | | | |
|---|---|---|---|
| 1,934,301 | 11/1933 | Godel | 34/13 |
| 2,434,419 | 1/1948 | Laughlin et al. | 34/35 |
| 2,492,132 | 12/1949 | Payne et al. | 34/13 |
| 2,518,409 | 8/1950 | Williamson | 34/13 X |
| 2,535,902 | 12/1950 | Dailey, Jr. | 55/33 |
| 2,562,334 | 7/1951 | Roberts | 34/34 |
| 2,675,089 | 4/1954 | Kahle | 55/62 |
| 2,699,837 | 1/1955 | Van Note | 55/33 X |
| 2,790,248 | 4/1957 | Dow | 34/13 X |
| 2,880,818 | 4/1959 | Dow | 55/62 |
| 3,061,992 | 11/1962 | Russell | 55/62 X |
| 3,104,953 | 9/1963 | Arend et al. | 34/22 X |
| 3,137,549 | 6/1964 | Kilgore et al. | 55/62 X |
| 3,177,631 | 4/1965 | Tamura | 55/79 X |
| 3,193,985 | 7/1965 | Siggelin | 55/33 |
| 3,216,178 | 11/1965 | Sauty | 55/33 |
| 3,323,288 | 6/1967 | Cheung et al. | 55/62 X |
| 3,359,706 | 12/1967 | Zankey | 55/20 |
| 3,446,031 | 5/1969 | Chi et al. | 55/34 X |
| 3,542,525 | 11/1970 | Pigford et al. | 55/62 X |
| 3,738,084 | 6/1973 | Simon et al. | 55/31 |
| 3,808,773 | 5/1974 | Reyhing et al. | 55/31 |
| 3,850,592 | 11/1974 | Huffman | 55/33 |
| 3,950,154 | 4/1976 | Henderson et al. | 55/33 X |
| 3,972,129 | 8/1976 | Graff | 34/80 X |
| 4,012,206 | 3/1977 | Macriss et al. | 55/34 |
| 4,048,727 | 9/1977 | Botkins | 34/13 |
| 4,126,946 | 11/1978 | Buffington et al. | 34/13 |
| 4,157,621 | 6/1979 | Asano et al. | 34/13 |
| 4,233,038 | 11/1980 | Tao | 55/33 |
| 4,324,564 | 4/1982 | Oliker | 55/20 |

OTHER PUBLICATIONS

D. Basmadjian, On the Possiblity of Omitting the Cooling Step in Thermal Gas Adsorption Cycles, Can. J. of Chem. Eng., vol. 53, Apr. 1975, pp. 234–238.

Lukchis, Adsorption Systems, Part I, Chemical Engineering, Jun. 11, 1973, pp. 111-116.

Lukchis, Adsorption Systems, Part II, Chemical Engineering, Jul. 9, 1973, pp. 83–87.

Lukchis, Adsorption Systems, Part III, Chemical Engineering, Aug. 6, 1973, pp. 83–90.

Johnston, Designing Fixed-Bed Adsorption Columns, Chemical Engineering, Nov. 27, 1972, pp. 87–92.

Wankat, The Relationship Between One-Dimensional and Two-Dimensional Separation Processes, AIChe Journal, vol. 23, No. 6, pp. 859–867.

Collins, The Lub/Equilibrium Section Concept for Fixed-Bed Adsorption, Chemical Eng. Progress Symposium Series, vol. 63, No. 74, pp. 31–35.

Rhee et al., An Analysis of an Adiabatic Adsorption Column, Chemical Eng. Journal (1) 1970, pp. 279–290.

*Primary Examiner*—Robert Spitzer
*Attorney, Agent, or Firm*—Lahive & Cockfield

[57] ABSTRACT

Disclosed is a method and apparatus for drying granular solids. A heated gas stream is directed through the volume of solids followed by a cooling gas stream. The method varies from conventional drying techniques by the alteration of the timing of the introduction of the cooling stream and by the use of sensible heat contained in the solids to supply heat of vaporization. The method yields improved energy efficiency and shorter drying times. The apparatus exhibits improved efficiency in carrying out the method of the invention than is possible using conventional equipment.

17 Claims, 16 Drawing Figures

SOLIDS DRYING

REFERENCE TO RELATED APPLICATIONS

The present application is a continuation of Ser. No. 484,159, filed Apr. 12, 1983, which is a continuation-in-part of co-pending application Ser. No. 361,134, filed Mar. 24, 1982, both now abandoned, a divisional of U.S. Pat. No. 4,324,564, and is related to copending U.S. applications Ser. No. 484,184, now abandoned, 484,176, now U.S. Pat. No. 4,479,814 and 484,186, now abandoned. The disclosures of all of the foregoing are incorporated herein by reference.

BACKGROUND OF THE INVENTION

This invention relates to the drying of granular solids. More particularly, it relates to a method and apparatus for removing water from granular solids in a more inexpensive and efficient manner. The phrase "granular solid," as used herein, refers to any regularly or irregularly shaped solid or semisolid particles, fibers, wafers, flakes, crystals or the like which can adsorb or absorb water and which can be dried by the application of heat by passage of a hot gas stream through a volume of the solid.

Granular solids often have an unacceptably high water content. One standard drying technique passes a stream of hot gas through the solids to desorb water followed by a cool stream to lower the solids' temperature. In this conventional method, the cooling gas is introduced when the effluent stream from the drying solid shows a decrease in water vapor concentration or an increase in temperature.

U.S. Pat. No. 4,324,564 discloses the "Four Front" method, an improved technique of operating sorption beds. As disclosed therein, regeneration of sorption beds occurs through the medium of moving fronts or regions in the sorption bed where changes in sorbent loading, temperature, and sorbate content of the gas occur. During regeneration, introduction of a hot gas stream into the bed creates a desorption front. This front, designated therein as an RW front, is bounded on its downstream side by bed conditions characteristic of equilibrium between the sorbent material and fluid waste ("W", sorbate-rich effluent), and on its upstream side by bed conditions characteristic of equilibrium between the hot sorbent material and hot regenerant gas ("R"). Upon subsequent introduction of cooling fluid, another front is created, designated therein as a thermal front or a "PR" front, which moves more rapidly than the RW front. The thermal front can arise in several ways. When the hot regenerant gas contains a substantial concentration of sorbate (i.e., water) and the coolant is substantially sorbatefree (assumed for purposes of discussion to have characteristics similar to dry product gas "P"), a PR transition is created comprising a faster stripping front which effects removal of all or most of the sorbate on the hot bed in equilibrium with the hot regenerant fluid, and a thermal front which effects the major temperature transition. Upstream of this transition, the bed is in equilibrium with coolant (herein designated "P"), while downstream, the bed is in equilibrium with hot regenerant. If sorbate is present in the coolant, multiple fronts are produced which together form the PR transition, including one front which constitutes the major thermal front. When the regeneration and cooling are conducted using substantially sorbate-free gas, the PR transition is a pure thermal wave bounded on its downstream side by bed conditions characteristic of equilibrium between the sorbent and the hot regenerant gas, and on its upstream side by bed conditions characteristic of equilibrium between the sorbent and the cooling gas.

U.S. Pat. No. 4,324,563 disclosed that a number of operational advantages including energy saving can be achieved by timing the introduction of the cooling gas prior to the breakthrough of the midpoint of the RW front. The preferred operation of the Four Front method for sorption bed regeneration introduces the cooling gas so that the thermal component of the PR transition is in the last third of the bed or most preferably at the bed exit when the slower RW front is at or breaking through the bed exit.

Prior art solids drying apparatus use conventional techniques rather than the Four Front method so more heat is needed to dry the solids than when the Four Front method is used.

Objects of the invention include a method of drying granular solids which is more energy and cost efficient than the methods previously used. Another object is to decrease heat consumption by using a portion of the sensible heat contained in the granular solids to assist in drying. A further object is to provide apparatus for drying granular solids in a more energy efficient manner. A still further object of the invention is to develop a system for continuous energy efficient solids drying.

Another object is to provide a sorption bed in apparatus for drying granular solids which removes moisture from the cooling gas stream and enables use of a stripping front to remove all or most of the water in the solids that was in equilibrium with the hot regenerant gas.

These and other objects and features of the invention will be apparent from the following description and the drawing.

SUMMARY OF THE INVENTION

It has been discovered that it is possible to use the sensible heat stored in a solid to provide heat of vaporization to complete drying of the solid. The invention includes recognition that a volume of moist granular solids is substantially the physical equivalent of a loaded sorption bed and that the heat used to dry granular solids can be significantly reduced by proper timing modification of the drying and cooling cycles. It has also been discovered that improved apparatus can be constructed which exploit the method of the invention.

In one aspect, the invention features a method of treating a volume of granular solids containing sorbed water to reduce the sorbed water content thereof. A hot gas stream, in passing through the volume of solid, forms a water-desorption front, the RW front, bounded on its downstream side by conditions characteristic of equilibrium between the moist granular solids and a gaseous, water-rich waste (W) and on its upstream side by conditions characteristic of equilibrium between dry granular solids and the hot gas stream (R). A cooling gas stream is then introduced cocurrent to the hot gas stream before the midpoint of the RW desorption front passes out of the solid. The cooling gas stream causes formation of the PR front, a thermal front which is faster than the desorption front and is bounded on its downstream side by high temperature conditions and on its upstream side by low temperature conditions. If the hot gas stream contains some water, introduction of the cooling gas stream will also create a stripping front which is faster than the cooling front and will remove all or most of the water sorbed on the solids that was in equilibrium with the hot gas stream. The timing of the introduction of the cooling gas stream may be controlled by a timer or a sensor for detecting an intrinsic property of the gas. The preferred timing of the introduction of the cooling gas stream is such as to have the cooling front exit the volume of granular solid just after the slower RW front. In this circumstance, the water content and the temperature of the waste exiting the volume both drop substantially simultaneously. The cooling gas stream may be desiccated before it is used by passage through a thermally regenerable sorption bed prior to its introduction into the solids volume. The sorption bed can be regenerated by the hot gas stream. The granular solids may be disposed in a housing or conveyed along a moving belt.

In another aspect, the invention features a method whereby the granular solids are conveyed into first and second zones for drying and cooling. In the first zone, a hot gas stream is introduced into the solids volume forming a desorption front. In one embodiment, in the second zone a cooling gas stream is introduced into the solid. The residence time of the solid in the first zone and the timing of the passage from the first to the second zone is set so that the desorption front and cooling front exit the volume in the second zone substantially simultaneously. The conveyor may include a sorption bed which desiccates the cooling gas stream prior to its entrance into the solids volume and which is regenerated by the hot gas stream. In another embodiment, cooling gas stream in the second zone is heated by passage through the solid to form a hot effluent stream which is recycled to supplement the hot gas stream in the first zone. The conveyor and thermally regenerable sorption bed may be recirculated and may recirculate along a linear path or circumferentially about an axis.

In a further aspect, the invention features an apparatus for drying granular material. The apparatus may be embodied as a conveyor system having two zones, a first zone where a hot gas stream is introduced into the granular material, and a second zone where a cooling gas stream is introduced into the material. The cooling stream is heated by passage through the material in the second zone to form a hot effluent stream. The hot effluent is connected to and supplements the hot gas stream in the first zone. Alternatively, the passage of the solid volume into the second zone is timed so that the desorption front created by the hot gas stream and the cooling front both leave the volume of solid at about the same time. Both embodiments of the conveying apparatus may also include a conveyed sorption bed.

In a still further aspect, the invention features apparatus for batch drying solid granular material by thermal desorption and cooling. The apparatus comprises a housing with an effluent exit, a thermally regenerable sorption bed, a heater, and a switch controller for activating and inactivating the heater. Means defining a flow path passing through the heater, the sorption bed, granular solid in the housing and the exit, allows passage of gas through the apparatus. The switch controller may be controlled by a timer or an intrinsic property sensor such as a temperature probe disposed within the housing. The switch controller inactivates the heater prior to detection of a decrease in water concentration in the effluent at the exit.

DESCRIPTION

In order to fully understand the nature and advantages of the invention, it is necessary to understand the physical chemistry of drying granular solid with a flowing hot stream. The invention includes recognition that the moist granular solid is substantially physically equivalent to a loaded sorption bed, and that the drying and cooling cycles in such drying procedures are substantially the same as the regeneration and cooling cycles used in sorption bed technology. Therefore, the description of the physical chemistry of the regeneration and cooling cycles of sorption beds contained in U.S. Pat. No. 4,324,564 is fully applicable to the present invention and is incorporated herein by reference.

FIGS. 1A–F are schematic diagrams representing a granular solid bed undergoing conventional drying and cooling cycles. The broken lines on each graph illustrate that only the section of interest is depicted rather than the entire bed. All the gas streams are illustrated entering from the left and the resultant fronts traverse the bed from left to right.

Figure 1A:
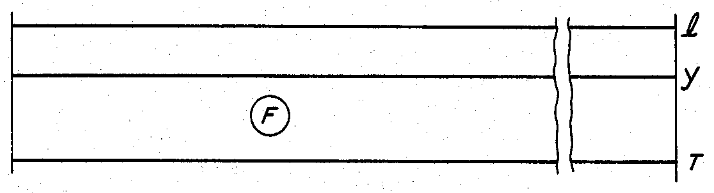
FIG. 1A (PRIOR ART)
FIGS. 1A–F are schematic diagrams illustrating the sequence of events which occur during a complete drying cycle of a bed of granular solids operated in the conventional (prior art) manner. The horizontal axis represents the length of the bed and the vertical axis represents increasing (upward) temperature(T), bed loading (1) and sorbate/gas feed weight ratio (y)
Figure 1B:
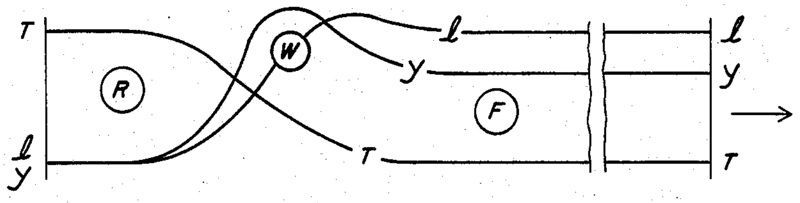
FIG. 1B (PRIOR ART)
Figure 1C:
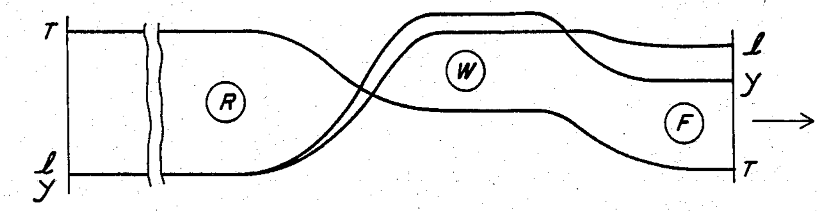
FIG. 1C (PRIOR ART)

FIG. 1A shows bed conditions prior to the introduction of the hot gas stream. The moist granular solids are at low temperature (T), high bed loading (1) and moderately high water/gas weight ratio(y). The solids are near equilibrium with the gas contained within its interstitial volume, here designated as "feed" (F). The water/gas weight ratiois related to the partial pressure of water vapor above the solids. FIG. 1B illustrates the volume of solids at a time slightly after introduction of a hot dry gas stream (R). The hot gas stream, having low y and 1 and high T enters the bed forming a slow desorption front RW. The RW front removes water from the granular solid and creates a fast front designated a WF front (FIG. 1C). The RW front is bounded by upstream conditions characteristic of equilibrium between the hot gas stream and the solids and downstream conditions characteristic of the water-rich waste fluid and the solids. Front WF is bounded upstream by conditions characteristic of equilibrium between the granular solid and the water-rich waste and downstream by conditions characteristic of equilibrium between the solid and the feed fluid. Region W has a temperature (T) intermediate that of the hot gas stream and the moist solid in equilibrium with the feed fluid, a high water content (y) and a high loading of water on the solid (1). Because of the difference in speed of the RW and WF fronts, the region in the solids in equilibrium with waste (W) grows progressively larger.

Figure 1D:
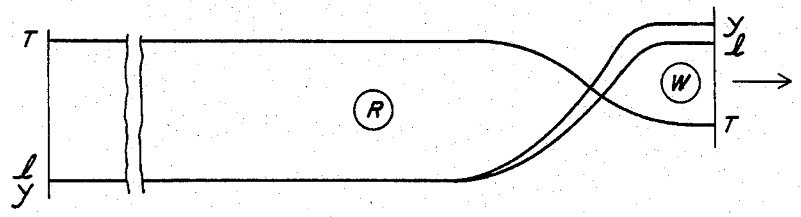
FIG. 1D (PRIOR ART)
Figure 1E:
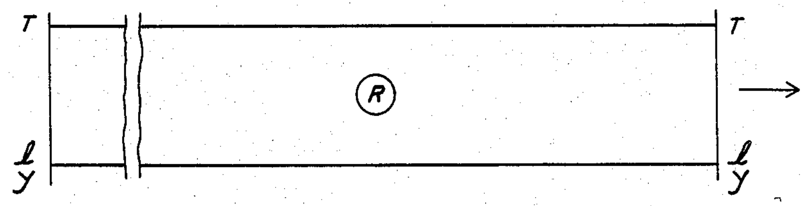
FIG. 1E (PRIOR ART)
Figure 1F:
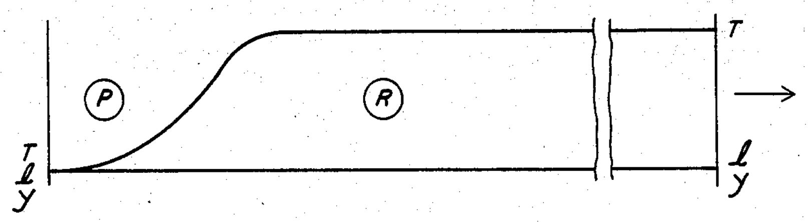
FIG. 1F (PRIOR ART)

In FIG. 1D, the WF front has broken through the volume of solid. The breakthrough coincides with an observable rise in the water content of the effluent and an increase in its temperature. The RW front is shown approaching the end of the flow path in the solids volume. When it breaks through, the temperature of the effluent increases and its water content drops to that of the hot gas stream. The condition of the solid volume at this point is shown in FIG. 1E: the solids are hot and dry, and the fluid contained in their interstitial volume is also dry.

At this point, dry cooling gas, here designated "P",is introduced into the solid volume. A cooling front PR passes rapidly therealong. As shown, the cooling front comprises the area of transition in the solids volume between equilibrium with the cooling gas (P) and equilibrium with the hot gas stream (R).

Figure 2A:
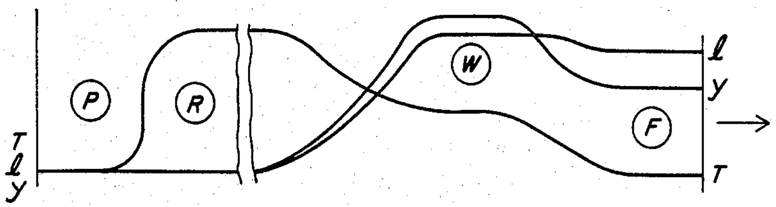
FIGS. 2A–C are similar schematic diagrams illustrating the changes in temperature, bed loading and sorbate/gas feed weight ratio for the method of the invention.
Figure 2B:
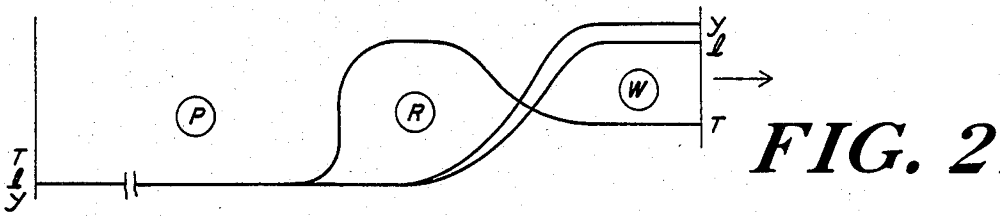
Figure 2C:
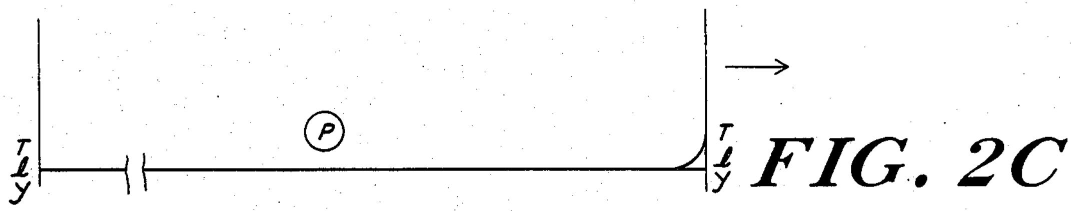

FIGS. 2A–2C illustrate the effect of introducing the cooling gas stream earlier as compared with conventional operation. In FIG. 2A the coolant has been introduced while the RW and WF fronts are still in the bed volume. However, contrary to intuition and the implications of the practice of the prior art drying method, early introduction of the cooling gas stream does not adversly affect drying. Thus, the WF front rapidly traverses the volume and breaks out, and the slower RW front continues to move in the direction of fluid flow (FIG. 2B). In accordance with the invention, the timing of the introduction of the cooling gas stream is such that the fast PR cooling front reaches the end of the volume of solids just after the RW front has broken out. In this circumstance, heat savings is maximized and the solid is just as dry as it is when practicing the conventional method. However, less heat and less gas has been used. FIG. 2C illustrates the end of the cooling cycle and shows the last of the PR front exiting the volume of solids.

The method disclosed herein will improve energy efficiency for any solids drying system, but the effect is most pronounced if the drying temperature (i.e., the temperature of the hot gas stream) is high. If the granular solid requires relatively low temperature drying (such as grain), the energy savings are reduced. The following example is purely illustrative of the efficiency of using the method of the invention and is intended to be non-limiting.

Assume a mass of wood chips are to be dried, which are in equilibrium with 75° F. air at 1 atmosphere pressure at a relative humidity of 40%. In this case the air in the interstitial volume of the wood chip mass will contain 0.0075 lb. of water/lb. of air. According to Proctor and Schwartz (Bulletin 491, 1/76) the loading on the wood chips will be 0.076 lb. water/lb. wood. Assume also that drying is to be conducted with a stream of air at 1 atm. and 275° F. The hot air has a relative humidity of 0.4% if it contains 0.0075 lb. water/lb. air. Thus, when the wood is in equilibrium with the hot gas, its loading will be 0.001 lb. of water/lb. of wood.

From the foregoing, by combining heat and mass balances and assuming thermal and mass velocities coincide, it can be calculated that the waste will be (approximately) at a temperature of 117° F., and its relative humidity will be 50% (0.04 lb. water/lb. waste). The loading of water on the wood chips in equilibrium with the waste will be approximately 0.10 lb. water/lb. of wood. Assuming that the heat of desorption of water is 1000 BTU/lb., that the heat capacity of air is 0.24 BTU/lb. ° F., and that the heat capacity of the wood is 0.57 BTU/lb. ° F. (Ashrae Applications Handbook, 1974), then the amount of heat contained in the waste will be about 310 BTU/lb. of water. The sensible heat retained in the wood chips, which is discarded in conventional drying techniques but saved using the method of the invention, will be about 1500 BTU per lb. of water. Total heat used conventionally will thus be about 2810 BTU/lb. water, and by the method disclosed herein about 1310 BTU/lb. water. This is a savings of greater than 50%.

Figure 3:
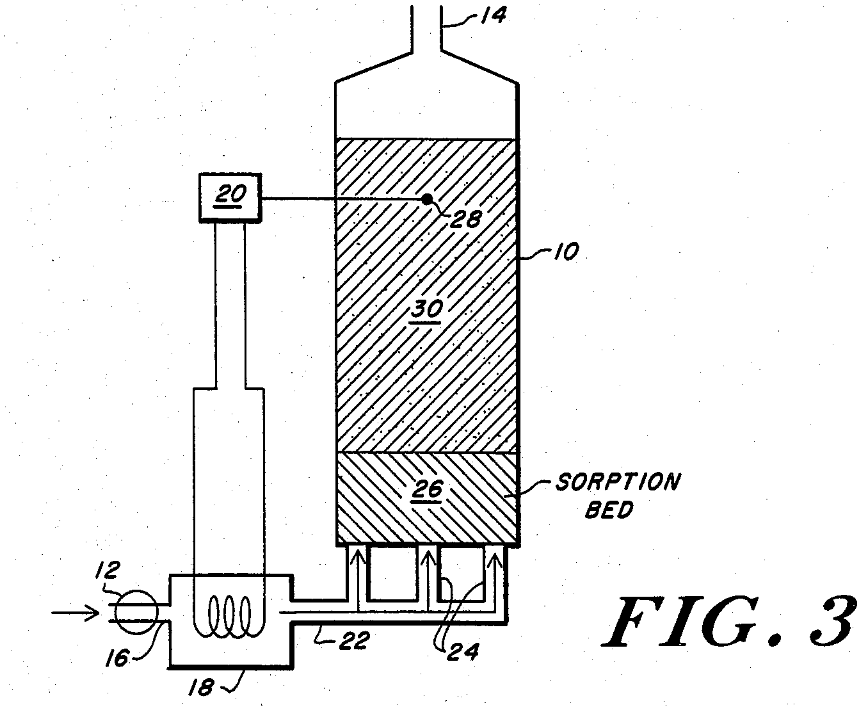
FIG. 3 is a schematic diagram illustrating one embodiment of the invention, an apparatus having a housing with an effluent exit, a regenerable sorption bed, a heater and a switch controller.

The invention also encompasses apparatus which utilize the method disclosed herein to improve energy efficiency. FIG. 3 illustrates one embodiment of the invention, an apparatus for drying batches of solids having a housing 10 for containing a batch of wet granular solid 30. Housing 10 has an effluent exit 14 at one end and input ports 24 leading to a thermally regenerable sorption bed 26 at its opposite end. In operation, a gas (such as air) is forced through an input 16 by an air mover 12 into a heater 18 which can be activated or inactivated by a switch controller 20. At the start of the drying cycle, switch controller 20 activates heater 18 to heat the input gas flowing from input 16. The hot gas stream leaves heater 18 through output 22, passes through input ports 24, and enters thermally regenerable sorption bed 26. Sorption bed 26 contains a loading of water from the previous cycle so the hot gas stream first regenerates sorption bed 26. During this time, a warm fluid waste enters the solids in housing 10. After bed 26 is desorbed, hot air enters the housing 10.

The hot air stream travels through granular solid 12 forming the RW and WF fronts as previously described in connection with FIGS. 1 and 2. At some time during the transit of desorption front RW through granular solid 30, switch controller 20 inactivates heater 18. Switch controller 20 may be connected to a timer which inactivates heater 18 at a predetermined time after introduction of the hot air stream, or more preferably, a sensor 28 located within the housing 10 within the volume of granular solids 30 senses a change in an intrinsic property of the gas flowing therethrough. When a predetermined value of the chosen intrinsic property is detected, sensor 28 sends a signal to switch controller 20 to inactivate heater 18. Sensor 28 may comprise a device for measuring the water vapor concentration of the air passing through the volume of solids, or most preferably, sensor 28 may comprise a temperature probe which detects the passage of the desorption front. Once heater 18 is inactivated, the input gas becomes a cool gas stream. The cool air stream is desiccated by passage through sorption bed 26, forming the dry cooling air stream for lowering the temperature of the granular solid by means of a PR front. When drying and cooling are complete as marked, for example, by a substantially simultaneous decrease in both the temperature and water content of effluent exiting through port 14, fluid mover 12 is inactivated and the dry solids are removed or sealed for storage. At this point, bed 26 contains a loading of water equal to the amount of water contained in the mass of cooling air that was passed through the solids. This apparatus is particularly useful for drying granular solids such as grain, replacing the present silo heating device.

In the apparatus illustrated in FIG. 3, the air exiting the sorption bed 26 during early stages of the hot air flow will vary in temperature and sorbate content. The profile of this bed effluent will be the outcome of a complex series of front collisions, but generally comprise a mass pulse of water with the moisture content first rising and then dropping, and the temperature first rising then tapering off, and then rising sharply. It is desirable to alter the temperature and water content of fluid exiting the sorption bed 26 that will enter the volume of solids so as to make its water content more uniform and to make its temperature high. If one imposes these characteristics on the fluid entering the volume of solids, the opportunity for moisture in this mass pulse to resorb and remain in the solid is greatly reduced.

Figure 7:
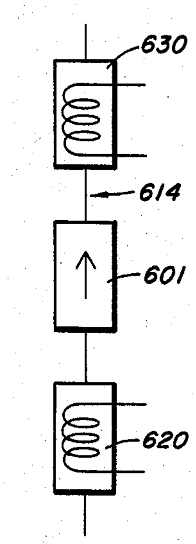

One means for heating and smoothing out the water concentration of the effluent from bed 26 is illustrated in FIG. 7. There a second heater 630 is placed downstream of the bed 601 and the first heater 620 in a system 614 that is otherwise functionally the same as and may be substituted for the heater and bed of the apparatus shown in FIG. 3. The second heater 630 minimizes resorption of water leaving bed 601 by heating the bed's effluent. After the water-rich effluent has been driven from bed 601, heater 630 may be inactivated.

Figure 8:
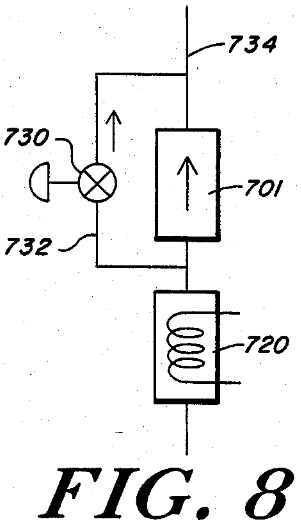

Another means for stretching out and reducing the peak sorbate concentration of the effluent is to provide a bypass system. One exemplary bypass system is shown in FIG. 8. It comprises a bypass valve 730 and a bypass conduit path 732 for passing some hot regenerant from heater 720 around the sorption bed 701. The valve 730 may be arranged to allow, for example, half of the output of the heater 720 to bypass the bed 701. The recombined flow in a conduit 734 downstream of the bed 701 would thus have a water pulse twice as long and half as high as there would be without the bypass, and would be hotter.

Figure 9:
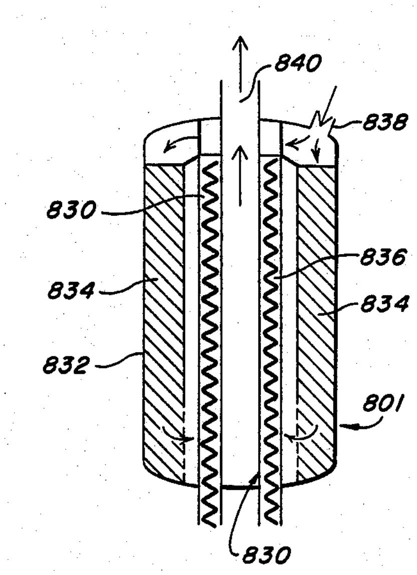

FIG. 9 illustrates another system for heating the mass pulse and making it more uniform. In the device shown, there is a heater 830 internal, or coincident with, the bed 801. This configuration is one of many possible internal heater bed designs. The bed 801 with internal heater 830, shown in FIG. 9, includes a housing 832, and sorbent mass 834 arranged as an annulus and heated by infrared radiation from axial heaters 830 spaced radially inwardly from the sorbent mass 834. Air enters the bed 801 at an inlet port 838, passes through the heated sorbent 834, passes over the heaters 836, and exits at an outlet port 840. The air is heated by convection and radiation in the sorbent mass 834. Water deposited during the previous solids drying cycle during the cooling stage is driven off the sorbent as it is heated by heater 830.

A heater internal to the sorption bed may be the only heater in the apparatus, in fact, so that no external heater is needed.

Another way of achieving this goal is by selection of the sorbent material used. Thus, the sorbent material in the bed 26 may be chosen to be a tenacious water holder (e.g., zeolite) to reduce the average magnitude of the mass pulse exiting the regeneration bed during its regeneration.

Figure 4:
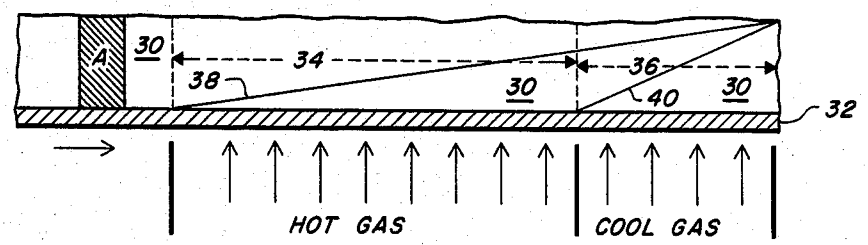
FIG. 4 is a schematic diagram illustrating a solids drying conveyer system embodying the invention.

FIG. 4 illustrates another embodiment of the invention, a conveyor system wherein the granular solid is transported through two zones, a first zone serviced by a hot gas stream and a second zone serviced by a cooling gas stream. The RW and PR fronts are illustrated in schematic form to assist in understanding the operation of the apparatus.

In the apparatus of FIG. 4, granular solid 30 is transported along recycling conveyor belt 32 from left to right and passes through first zone 34 and second zone 36. In first zone 34, a hot gas stream enters granular solid 30 forming RW (desorption) front 38. Before RW front 38 can exit granular solid 30, conveyor belt 32 brings granular solid 30 into second zone 36. In second zone 36, the cooling gas stream enters granular solid 30 forming a PR (thermal) front 40 which rapidly traverses the volume of granular solid 30, reaching the top at or just after RW front 38. If schematic diagrams were drawn showing the state of a volume (e.g., volume A) of granular solid 30 on passage through the apparatus, the diagrams would look similar to FIGS. 1A–1C when volume A is in first zone 34, and similar to FIGS. 2A–2C when volume A is in second zone 36. In effect, the movement of conveyor belt 32 acts as a timing mechanism.

One potential problem with the embodiment illustrated in FIG. 4 is that unless the gas streams are predried, the final loading (1) on the granular solid would be dependent on the ambient water/air weight ratio (y). Improved drying is achieved using an alternative embodiment of the invention, a continuous conveyor system including a moving sorption bed illustrated in FIG. 5. This system transports granular solid 50 left to right along a recycling conveyor belt 52. Granular solid 50 is loaded onto conveyor belt 52 at loading station 54 and is off-loaded at removal station 56 into waiting hoppers 58. A thermally regenerable, recycling sorption bed 60 lies just above conveyor belt 52 and travels with granular solid 50 and belt 52. In operation, granular solid 50 is loaded on conveyor belt 52 above sorption bed 60 at loading station 54. Granular solid 50 is conveyed to first zone 62 where the hot gas stream forms desorption wave 70 which thermally regenerates sorption bed 60. The hot gas stream then enters granular solid 50 and forms desorption wave 72, an RW front as shown in FIGS. 1 and 2. Granular solid 50 is next conveyed into second zone 64. There the cooling gas stream cools sorption bed 60 as a cooling wave 61 passes therethrough. The cooling gas is dried by sorption bed 60 across a sorption front 63. It then forms a fast thermal PR front 74 in granular solid 50. The speed of conveyor belt 52, the length of the zones, the temperature of the hot gas, the length of the flow path through the solid, the flow rate of the gas, and the amount of water in the solid all have an effect on the timing of the system. In a system designed in accordance with the invention, the RW front 72 and PR front 74 will collide at or just out of the top of granular solid 50.

Figure 5:
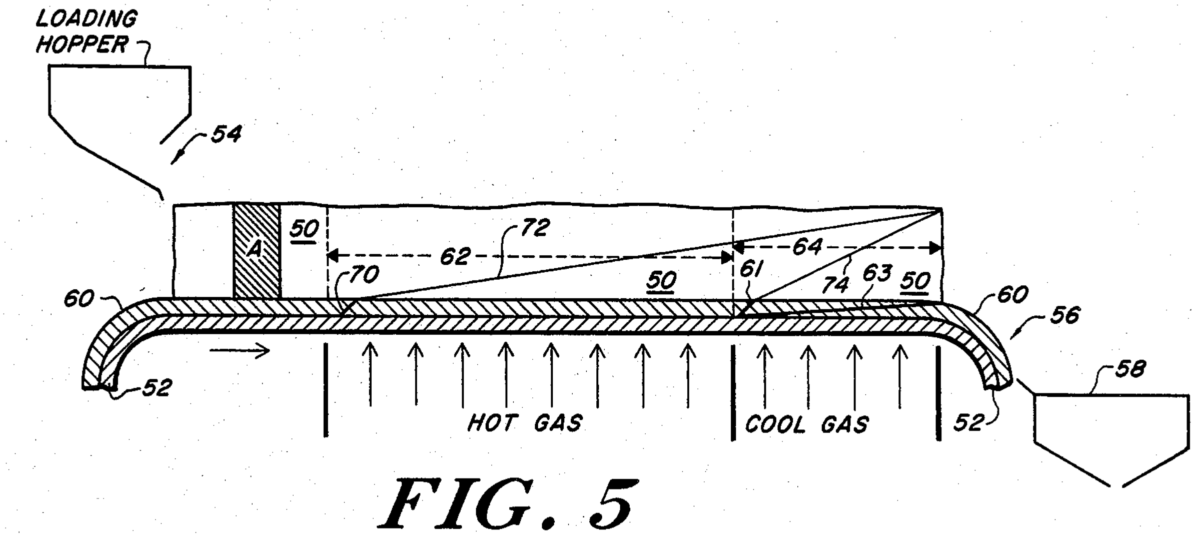
FIG. 5 is a schematic diagram illustrating another embodiment of the invention, a conveyor system with a sorption bed directly above a moving belt and a cocurrent cooling gas flow.

The identity of operation of the embodiments illustrated in FIG. 3 and 5 is evident. A cross-section of granular solid (illustrated as "A" in FIG. 5) passing through the conveyor system first receives warm, water-rich waste from the sorption bed followed sequentially by the drier hot gas stream and the desiccated cool gas stream. The timing supplied by the conveyor belt in FIG. 5 is the equivalent of using a timer to control the switch controller in FIG. 3. The major difference is that FIG. 3 illustrates a batch processing system while FIG. 5 illustrates a continuous system.

Figure 6:
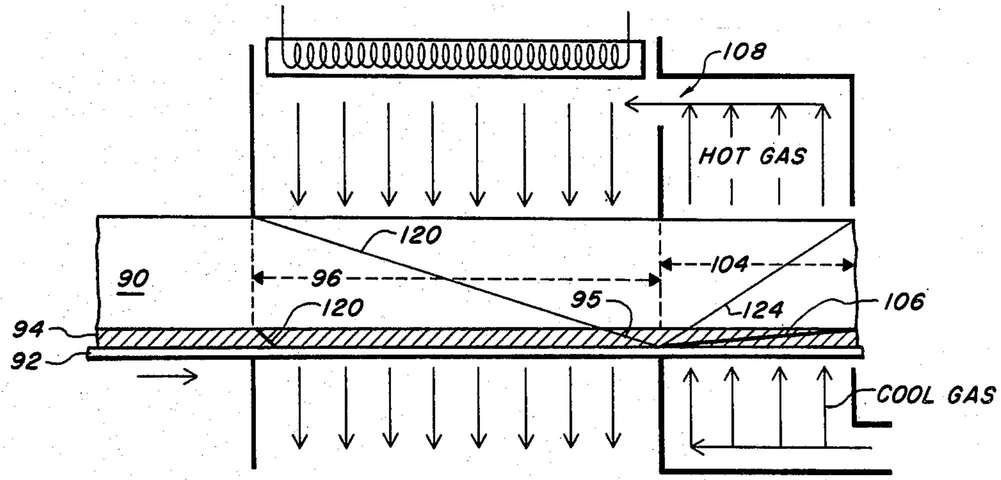
FIG. 6 is a schematic diagram illustrating still another embodiment of the invention, a conveyor system with a sorption bed and a countercurrent recycled cooling gas flow.

FIG. 6 illustrates another embodiment of the invention, a continuous countercurrent conveyor system which uses recycled heat to achieve improved energy efficiency. More specifically, FIG. 6 illustrates a system where the sensible heat of the bed is swept out and directly supplements the hot gas stream. Granular solid 90 is transported (left to right) along conveyor belt 92 together with a thermally regenerable sorption bed 94. Granular solid 90 enters first zone 96 where the hot gas stream flows downward by forming RW desorption front 120. Waste exiting the solids 90 produces a front 120 which loads conveyed sorption bed 94. As desorption wave 120 passes out of granular solids 90, it enters and passes through sorption bed 94 as shown at 95, thereby regenerating sorption bed 94 and heating it. At this point the solid is hot and contains a water loading proportional to the equilibrium partial pressure of water (if any) that was contained in the hot gas stream.

Granular solid 90 is then conveyed to second zone 104. There, cool ambient air is desiccated by passage through regenerated sorption bed 94 as it moves across sorption front 106 and enters granular solid 90 countercurrent to the hot gas stream creating a PR thermal front 124. A fast stripping front (e.g., 125) will also be produced if the hot regenerant contained moisture. The dry gas of the cooling wave is heated by the sensible heat of granular solid 90 and emerges from granular solid 90 at elevated temperature. This now hot gas stream is recirculated, exiting second zone 104 at output port 108, and supplementing the hot gas stream in first zone 96. One advantage of this arrangement is that the desorption wave is driven completely out of the solids, thereby assuring that a deposit of moisture will not be left adjacent the exit point of the hot gas stream in the solid.

The method and apparatus disclosed herein can be varied to meet the problems associated with drying different granular solids. Those skilled in the art will appreciate that these variations and alternate embodiments do not change the underlying process or apparatus. Non-limiting examples of solids which can be dried in accordance with the process of the invention include natural and synthetic textile fibers, paper, foodstuffs, organic materials, and inorganic materials.

Other embodiments are within the following claims.

What is claimed is:

1. A method of thermally treating a volume of granular solid containing sorbed water to reduce the sorbed water content thereof, said method comprising the steps of:

A. flowing a hot gas steam through said solid along a path comprising an entrance into solid, a zone through the volume of said solid, and an exit out of said solid to create during passage of said hot gas stream through said volume a moving water-desorption front having a first velocity and being bounded, on its downstream side, by conditions characteristic of equilibrium between said granular solid containing sorbed water and a gaseous, water-rich waste, and on its upstream side, by conditions characteristic of equilibrium between said granular solid of a reduced water content and said hot gas stream;

B. flowing a cooling gas steam through a thermally regenerable sorption bed volume to reduce the concentration of water in said cooling gas stream; and C. thereafter flowing said cooling gas stream along said path to create a cooling front having a second velocity greater than said first velocity, said cooling front being bounded on its downstream side by high temperature conditions, and on its upstream side by low temperature conditions, the introduction of said cooling gas stream being times to pass said entrance before the mid-point of said desorption front passes said exit, and further being timed such that the temperature of waste passing said exit and the concentration of water in the waste both decrease substantially simultaneously and the entirety of said volume of said granular solid is desorbed.

2. The method of claim 1 wherein the timing of the introduction of said cooling gas stream into the volume of said solid is controlled by a signal generated by timing means.

3. The method of claim 1 wherein the timing of the introduction of said cooling gas stream into the volume of said solid is controlled by a signal generated by means for sensing an intrinsic property characteristic of gas at a selected point within said volume.

4. The method of claim 3 wherein said means for sensing comprises a temperature sensor disposed within said volume of granular solid, said signal being generated in response to a change in temperature within a portion of said volume and being indicative of the movement of said desorption front past said temperature sensor.

5. The method of claim 1 wherein said sorption bed volume is thermally regenerated by a hot gaseous stream before said cooling gas stream is passed therethrough.

6. The method of claim 5 wherein said hot gaseous stream comprises said hot gas stream.

7. The method of claim 6 wherein said volume of granular solid is disposed within a housing, said entrance into said solid comprises gas distribution means fixed to said housing, and said exit comprises a qas effluent port passing through said housing.

8. The method of claim 1 wherein said volume of of granular solid is disposed on conveying means, step A is conducted by conveying said volume through said hot gas stream and step C is conducted by conveying said volume through said cooling gas stream.

9. The method of claim 8 wherein said conveying means comprises recirculating conveying means having a granular solid loading station and a granular solid unloading station.

10. The method of claim 9 wherein, during step B, said cooling gas stream is passed through a conveyed thermally regenerable sorption bed to reduce the concentration of water in said cooling gas stream.

11. The method of claim 10 wherein said conveyed sorption bed cyclically removes water in said cooling gas stream prior to step C and is regenerated by said hot gas stream.

12. A method of thermally treating a volume of granular solid containing sorbed water to produce granular solid of a reduced water content, said volume being disposed on recirculating conveying means, said conveying means having a conveyed, thermally regenerable sorption bed conveyed together with said volume, said method comprising the steps of:

A. conveying said volume to a first zone wherein a hot gas stream is passed through said volume to create within said volume a moving, water-desorption front bounded, on its downstream side, by conditions characteristic of equilibrium between said granular solid containing sorbed water and a gaseous water-rich waste, and on its upstream side, by conditions characteristic of equilibrium between said granular solid of reduced water content and said hot gas stream, said desorption front moving substantially through said volume so that said volume is at equilibrium with said hot gas stream;

B. conveying said volume to a second zone wherein a cooling gas stream is passed through said volume, said cooling gas stream being heated during passage through said volume to produce a hot effluent stream;

C. directing said hot effluent stream to supplement said hot gas stream;

D. regenerating said sorption bed in said first zone by passing said hot gas stream through said sorption bed; and E. reducing the water content of said cooling gas stream by passing said cooling gas stream through said regenerated sorption bed.

13. The method of claim 12 wherein said cooling gas stream passes through said second zone countercurrent to said hot gas stream.

14. The method of claim 12 wherein said conveying means conveys said volume linearly.

15. The method of claim 12 wherein said conveying means conveys said volume circumferentially about an axis.

16. Appartus for drying solid granular material comprising:

a conveyor for conveying said material through first and second zones;

means for passing a hot gas stream through material in said first zone;

means for passing a cooling gas stream through material in said second zone;

means for passing effluent produced during passage of said cooling gas stream through said solid in said second zone to supplement said hot gas stream in said first zone; and a conveyed, thermally regenerable sorption bed disposed to sorb water from said cooling gas stream before said stream passes through sais second zone.

17. Apparatus for drying solid granular material comprising:

a conveyor for conveyor said material through first and second zone;

means for passing a hot gas stream through material in said first zone to produce a slow water desorption front within the material;

a conveyed, thermally regenerable sorption bed disposed to sorb water from a cooling gas stream before said stream is passed through said second zone;

means for passing a cooling gas stream, cocurrent to said hot gas stream, thorugh said sorption bed and through material in said second zone to produce a fast cooling front; and means for controlling the residence time of said material in said first zone whereby the midpoint of said desorption front and said cooling front exit said material substantially simultaneously, the temperature of waste leaving said material and the concentration of water in the waste both decrease substantially simultaneously, and the entirety of said material is dry.

* * * * *